March 15, 1932. G. R. HOOK 1,849,427
HANDLE OF TOOLS DRIVEN BY FLEXIBLE SHAFTS
Filed Oct. 17, 1928
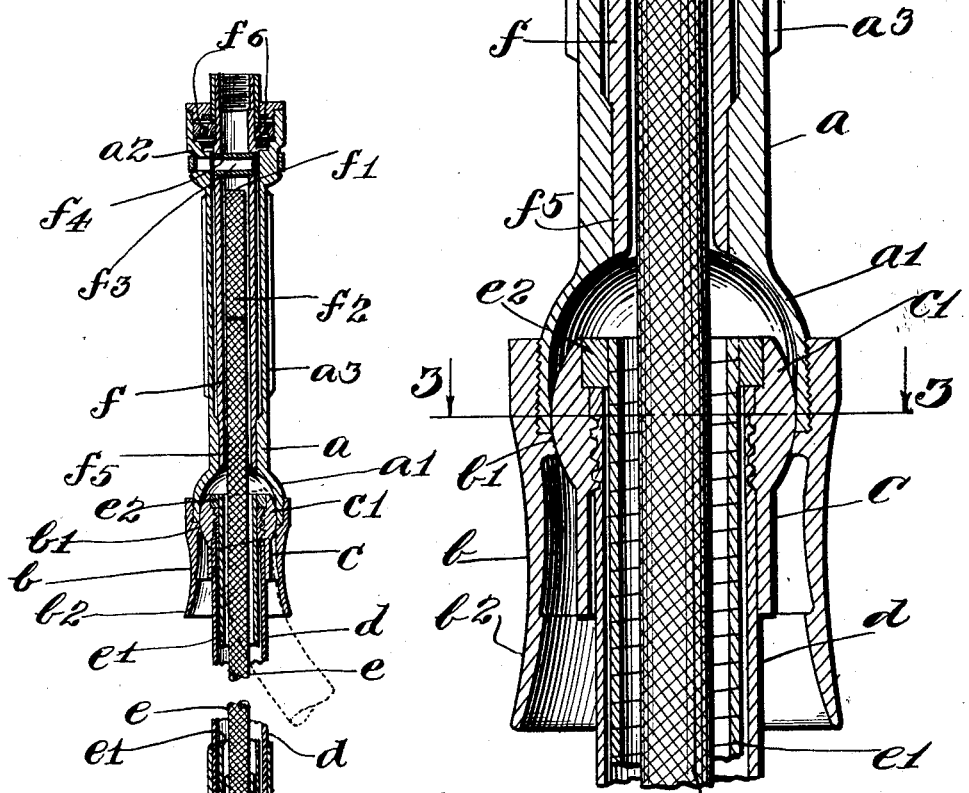
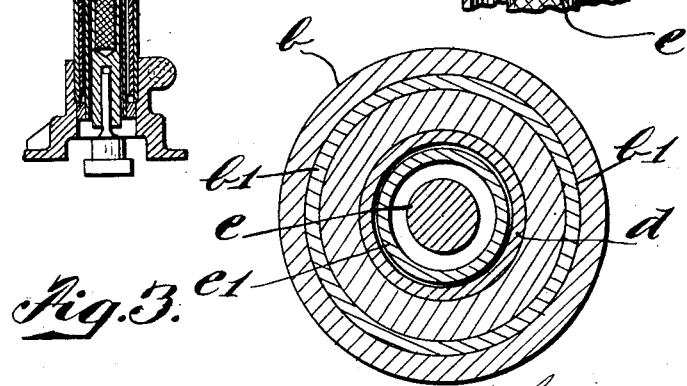

Patented Mar. 15, 1932

1,849,427

UNITED STATES PATENT OFFICE

GEORGE RAYMOND HOOK, OF LONDON, ENGLAND, ASSIGNOR TO THE WESTMINSTER TOOL AND ELECTRIC COMPANY LIMITED, OF LONDON, ENGLAND

HANDLE OF TOOLS DRIVEN BY FLEXIBLE SHAFTS

Application filed October 17, 1928, Serial No. 313,162, and in Great Britain October 17, 1927.

This invention has reference to the handles for holding and manipulating tools operated through the instrumentality of a flexible shaft, that is to say: a shaft comprising a flexible metal core in a flexible metal or other tube or armouring, the core being adapted to be rotated by mechanism at one end and to drive a tool at the other end.

All such handles heretofore in vogue comprise an outside tubular member adapted to be fixed to the armouring of the shaft, a spindle rotatable on bearings within the tubular member extending from a point near the rear end (i. e. the end remote from the tool) and protruding at the other end adapted at the rear end to be secured to the flexible core and means for securing the protruding end of the spindle to the tool. It is common to introduce the flexible core into a recess formed in the rear end of the spindle and to secure it by means of soldering, or with a split sleeve and collar, or binding screws, and to affix the outer tube or armouring to the rear end of the tubular member by a soldered joint or binding sleeve, in such a manner that the tube or armouring becomes an integral part of the tubular member of the handle.

In all such handles, in the using and manipulating of the tool both bending and torsional strains of the flexible core are concentrated at the point of junction thereof with the rear end of the spindle, and a constant bending strain is applied to the armouring at the rear orifice of the handle, and such strains ultimately cause the breaking of the flexible core and/or the armouring.

The object of this invention is to relieve the said bending strain on the outer tube or armoring and to prevent the concentration of the bending and torsional strains at one point in the case of the flexible core and so extend the life of the shaft.

According to this invention the handle comprises, in addition to the other elements above referred to, a member connected to the tubular member and capable of varying its alignment to a substantial extent relative thereto, preferably in all directions, to which member, the outer armouring is fastened. Preferably such member is also capable of a small amount of axial movement relative to the tubular member.

A further part of this invention consists in adopting a hollow spindle, or one with a tunnel or hole bored or formed co-axially from the rear end thereof for a substantial distance, so that the flexible core can be inserted therein and soldered to the spindle at a point remote from the rear end thereof, leaving a clearance between the wall of the spindle and the flexible core for a substantial distance.

In the accompanying drawings Fig. 1 is a central lengthwise section of the handle embodying my invention.

Fig. 2 is a similar section, on an enlarged scale, of the universal joint constituting an essential feature.

Fig. 3 is a cross section on the line 3—3 of Fig. 2.

I now describe by reference to the drawings hereto annexed by way of example a more particularized form of my invention. The main body of the holder consists of two sections $a$ and $b$. The section $a$ is formed with a spherical end part $a^1$ an enlarged end $a^2$ and a knurled part $a^3$. The spherical part $a^1$ is extended towards its open end by a short distance with parallel sides in order to allow a small relative axial movement of the spherical part $c^1$ hereinafter described.

The part $b$ has an internal thread to engage an external thread on the spherical part $a^1$, a flange $b^1$ which locates this part axially in reference to the part $a$ and a bell shaped end $b^2$.

$c$ is a sleeve formed with a spherical end $c^1$ which fits in the spherical end $a^1$ of part $a$ and is held therein by the flange $b^1$. $d$ is the outer armouring of a flexible shaft of the kind known as a "double interlocked flexible metallic tubing". The sleeve $c$ is secured to the outer armouring. In the drawings sleeve $c$ is formed with an internal thread corresponding to the external thread incident to the said armouring and is screwed on to the end of the armouring. $e$ is the rotating core and $e^1$ a steel tape commonly helically wound inside the armouring $d$, $e^2$ is a metal collar soldered to the steel tape and fitting in a recess in the spherical end $c^1$ to prevent all possibility of the sleeve becoming detached from the armouring. $f$ is a spindle with a hole drilled down the centre from the rear end to the point marked $f^1$ into which hole the core $e$ is inserted, and in which it is soldered for part of its length as indicated at $f^2$. $f^3$ is a transverse hole through the rod $f$ and $f^4$ is a steel bush inserted therein. The hole $f^3$ registers with corresponding holes through the enlarged part $a^2$ for the purpose of inserting therethrough temporarily a pin to locate the rod $f$ to facilitate the removal or replacement of the tool. The spindle $f$ rotates at one end in a bearing formed at $f^5$ on the tubular member $a$ and at the other end in ball bearings $f^6$.

In assembling, the rear section $b$ of the tubular member is threaded over the end of the armouring $d$ of the shaft, the sleeve $c$ is then threaded over the end of the shaft, the end of the flexible core is then inserted in the foreward section $a$ of the tubular member and passed down the hollow rod or spindle $f$ and is soldered therein. The said sleeve $c$ is then fixed to the end of the outer tube or armouring. The rearward section $b$ of the tubular member is then screwed on to the forward section $a$.

With a handle constructed as above described, in ordinary use the bending strain on the outer tube or armouring is reduced to a minimum, owing to the flexibility of the joint, and the bending and torsional strains on the flexible core are not concentrated at one point, the torsional strain being immediately behind the soldered joint while the bending strain is to the rear of the rod or spindle. A further advantage of such a handle is that it yields increased freedom of movement for the operator, reducing fatigue and giving him perfect control over the tool.

Further by reason of the extreme end of the forward portion of the tubular member terminating with a parallel part, the sleeve (carrying with it the outer armouring) can move forward to a limited extent axially, relatively to the handle, and thus accommodate to any momentary shortening of the flexible core, due to twisting under torsional strain.

It will be apparent that this invention is not limited to any particular form of joint such as a ball and socket joint. There are several other forms of joint which would be equally applicable.

What I claim is:—

1. A holder for tools operated by a flexible shaft comprising an outer tubular member, a spindle rotating on bearings within such tubular member and adapted at the forward end to be affixed to the tool, and at the other end secured to the core of the flexible shaft, the tubular member being formed in two sections secured together by engaging threads, and the sections shaped at their engaging ends to form a spherical socket, with a sleeve member located within the tubular member said sleeve member being secured to the armoring of the shaft, shaped at one end as a sphere and adjustably located in the said spherical socket to form a flexible joint.

2. A holder as claimed in claim 1, the sleeve member being internally threaded to engage a thread formation on the said armoring.

3. A holder as claimed in claim 1, the sleeve member having formed thereon an annular internal recess adapted to receive a metal ring soldered to a steel lapping of the flexible shaft.

4. A holder as claimed in claim 1, the spherical socket being formed for a short distance with parallel sides.

5. A holder for tools operated by a flexible shaft comprising an outer tubular member, a spindle rotating on bearings within such tubular member and adapted at the forward end to be affixed to the tool, and at the rear end secured to the core of the flexible shaft, the tubular member being formed in two sections secured together by engaging threads being shaped at their engaging ends to form a spherical socket, a sleeve member within the tubular member and secured to the armoring of the shaft and shaped at the forward end as a sphere, said sleeve being located in the said spherical socket, the said spindle being formed with an elongated concentric hole drilled from the rear end thereof to enable the core to be soldered therein at a point a substantial distance from the opening of such hole.

In testimony whereof I, the said GEORGE RAYMOND HOOK, affix my signature.

GEORGE RAYMOND HOOK.